(12) United States Patent

Tanaka

(10) Patent No.: US 8,634,298 B2
(45) Date of Patent: Jan. 21, 2014

(54) COMMUNICATING APPARATUS AND COMPUTER READABLE MEDIUM THEREOF

(75) Inventor: Tatsuyuki Tanaka, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 492 days.

(21) Appl. No.: 12/946,352

(22) Filed: Nov. 15, 2010

(65) Prior Publication Data

US 2011/0310984 A1    Dec. 22, 2011

(30) Foreign Application Priority Data

Jun. 16, 2010    (JP) ................................. 2010-137449

(51) Int. Cl.
    *G01R 31/08*    (2006.01)
(52) U.S. Cl.
    USPC .......................................... 370/235; 370/252
(58) Field of Classification Search
    USPC .................................................. 370/252, 235
    See application file for complete search history.

(56) References Cited

U.S. PATENT DOCUMENTS

| 2003/0055995 A1* | 3/2003 | Ala-Honkola ................ 709/231 |
| 2008/0244001 A1* | 10/2008 | Fang ............................ 709/203 |
| 2011/0235512 A1* | 9/2011 | Yuki .......................... 370/230.1 |

FOREIGN PATENT DOCUMENTS

JP    10-150546 A    6/1998

* cited by examiner

*Primary Examiner* — Sai-Ming Chan
(74) *Attorney, Agent, or Firm* — Sughrue Mion, PLLC

(57) ABSTRACT

A communicating apparatus includes a first acquire unit that acquires a first bandwidth to be a usage bandwidth of the communicating apparatus; a negotiation unit that negotiates by utilizing information corresponding to the first usage bandwidth in relation to a transmission speed in an execution of a communication with another communicating apparatus connected to the communicating apparatus through a network; a second acquire unit that acquires a second usage bandwidth as a negotiation result obtained by the negotiation unit; and a communicating unit that transmits data to the another communicating apparatus at a lower transmission speed than a transmission speed based on the first usage bandwidth corresponding to information about the second usage bandwidth.

13 Claims, 13 Drawing Sheets

*FIG. 8*

| RETRANSMISSION GENERATION RATIO (%) | REGULATION RATE OF USAGE BANDWIDTH (%) |
|---|---|
| 0 | 0 |
| 1-25 | 5 |
| 26-50 | 10 |
| 51-75 | 15 |
| 76 OR MORE | 20 |

COMMUNICATING APPARATUS AND COMPUTER READABLE MEDIUM THEREOF

CROSS-REFERENCE TO RELATED APPLICATION

This application is based on and claims priority under 35 USC 119 from Japanese Patent Application No. 2010-137449 filed on Jun. 16, 2010.

BACKGROUND

Technical Field

The present invention relates to a communicating apparatus and a computer readable medium thereof.

SUMMARY

A communicating apparatus includes:

a first acquire unit that acquires a first usage bandwidth to be a usage bandwidth of the communicating apparatus;

a negotiation unit that negotiates by utilizing information corresponding to the first usage bandwidth in relation to a transmission speed in an execution of a communication with another communicating apparatus connected to the communicating apparatus through a network;

a second acquire unit that acquires a second usage bandwidth as a negotiation result obtained by the negotiation unit; and a communicating unit that transmits data to the another communicating apparatus at a lower transmission speed than a transmission speed based on the first usage bandwidth corresponding to information about the second usage bandwidth.

BRIEF DESCRIPTION OF THE DRAWINGS

Embodiments of the invention will be described in detail based on the following figures, wherein:

FIG. 8 is a diagram for explaining information about a relationship between retransmission information and a regulation rate of a usage bandwidth according to the third embodiment.

DETAILED DESCRIPTION

Figure 1:
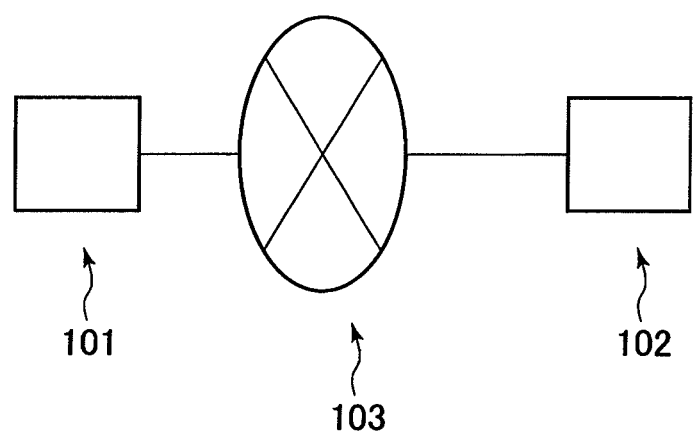
FIG. 1 is a diagram for explaining a communicating apparatus according to a first embodiment.

Embodiments according to the invention will be described below with reference to the drawings. Referring to the drawings, the same or equivalent elements have the same reference numerals and repetitive description will be omitted.

[First Embodiment]

FIG. 1 is a diagram for explaining a communicating apparatus according to a first embodiment. As shown in FIG. 1, a communicating apparatus 101 according to the embodiment is connected to another communicating apparatus 102 through a network 103.

The communicating apparatuses 101 and 102 are network facsimile apparatuses for transmitting/receiving data to/from a partner by using a network in addition to a public telephone network, for example. More specifically, they are network facsimiles for carrying out an IP fax communication based on a so-called T.38 protocol, for example.

Moreover, the network 103 represents a network in which a guarantee bandwidth is ensured through a contract, for example. The guarantee bandwidth indicates a value determined in a utilization contract of the network 103 and implies a capability of the network 103 itself, and represents a transmission speed of a packet which can be taken at a maximum in a utilization of the network 103 by the communicating apparatus connected to the network 103.

The communicating apparatus 101 calls the communicating apparatus 102 to be a communicating destination through the network 103, and sets a communicating path between the communicating apparatuses 101 and 102 to transmit data. The communicating apparatuses 101 and 102 apply a communicating protocol specified in the T.38 to carry out a data communication, for example. Since a communicating procedure of the T.38 is well-known, detailed description will be omitted.

Figure 2:
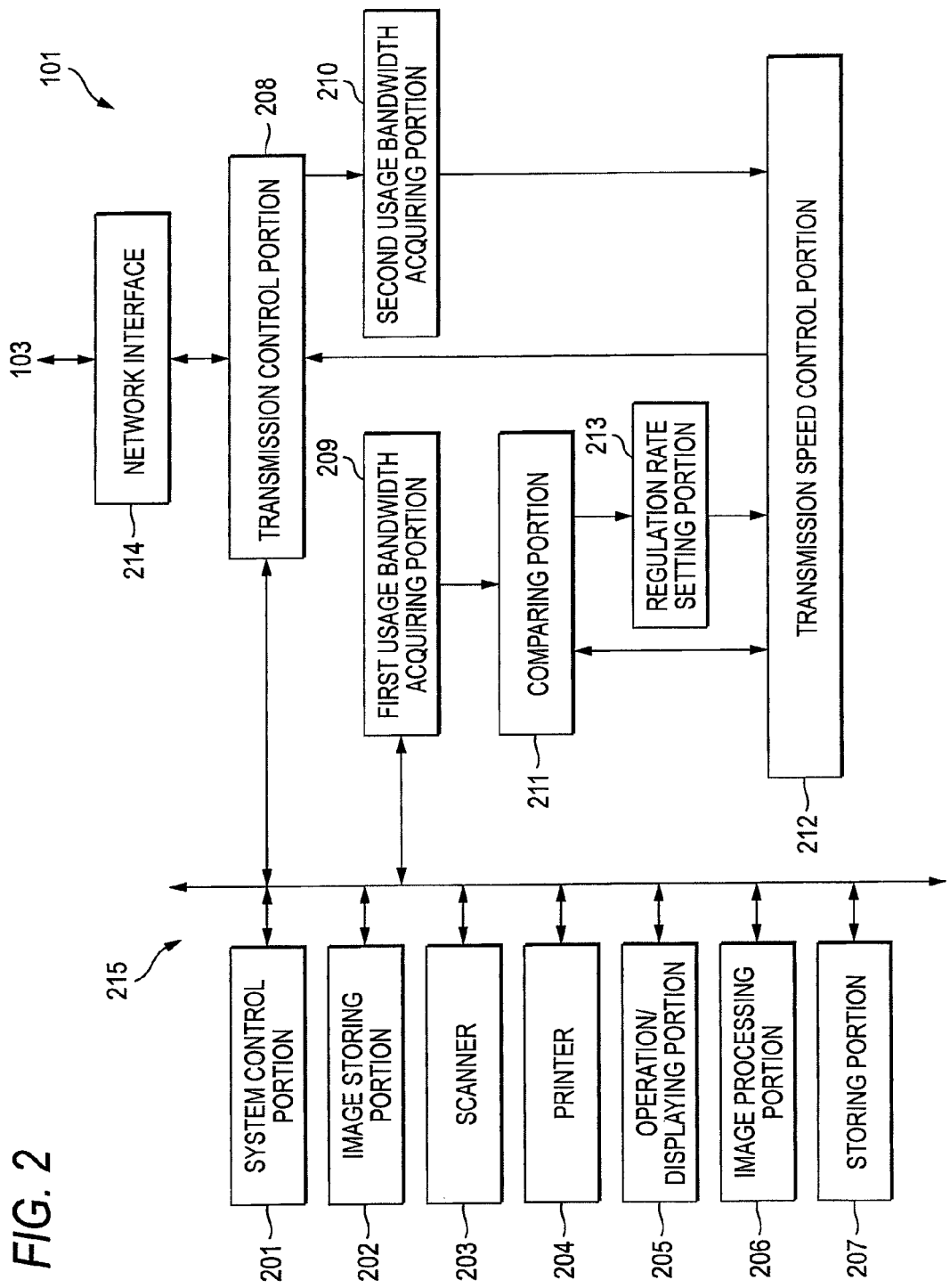
FIG. 2 is a diagram for functionally explaining a structure of the communicating apparatus according to the first embodiment.

FIG. 2 is a diagram for functionally explaining a structure of the communicating apparatus according to the embodiment. As shown in FIG. 2, the communicating apparatus 101 according to the embodiment has a system control portion 201, an image storing portion 202, a scanner 203, a printer 204, an operating/displaying portion 205, an image processing portion 206, a storing portion 207, a transmission control portion 208, a first usage bandwidth acquiring portion 209, a second usage bandwidth acquiring portion 210, a comparing portion 211, a transmission speed control portion 212, a regulation rate setting portion 213 and a network I/F 214, for example.

A function of each of the portions is implemented by a CPU and a memory which are included in the communicating apparatus 101, for example. The CPU is a processing unit for executing a program stored in the memory, and controls each portion of the communicating apparatus 101 and implements each function which will be described below. For example, the program may be downloaded and offered through the network or may be offered by various computer readable information recording media such as a CD-ROM and a DVD-ROM.

The system control portion 201 carries out a control processing for each portion of the communicating apparatus 101.

The image storing portion 202 stores an image read by the scanner 203 or an image received from another communicating apparatus 102, for example.

The scanner 203 reads an image of a document at a preset resolution. The resolution is set by a user, for example.

The printer 204 prints the image read by the scanner 203 or the image received from the another communicating apparatus 102 at the preset resolution, for example. The resolution is set by the user, for example.

The operating/displaying portion 205 is utilized for operating the communicating apparatus 101 by the user and has an operating key and a screen such as a liquid crystal display screen. More specifically, for example, the user utilizes the operating key to specify the communicating apparatus 102 which is a communicating destination or to give an instruction for enlarging/reducing an image to be transmitted.

The image processing portion 206 executes a processing for encoding, decoding, enlarging and reducing data on the image read by the scanner 203 or the image received from the another communicating apparatus 102, for example.

The network I/F 214 is connected to the network 103 and receives a signal from the network 103, and furthermore, transmits a signal or data to the network 103. Moreover, the network I/F 214 executes an interface processing, for example, a signal conversion and a protocol conversion.

The storing portion 207 stores a program or data for carrying out the embodiment and a usage bandwidth of the communicating apparatus 101. The usage bandwidth indicates a transmission speed of data which can be taken at a maximum as the communicating apparatus in the utilization of the network 103 (a transmission quantity per unit time), and is set to have a value which is equal to a value in the utilization contract of the network 103 or a value which is smaller than the value in the utilization contract of the network 103. In the embodiment, description will be given on the assumption that the usage bandwidth is the same as the guarantee bandwidth ensured in the network 103 to which the communicating apparatus 101 is connected.

The first usage bandwidth acquiring portion 209 acquires the usage bandwidth (a first usage bandwidth) of the communicating apparatus (a transmitting side) 101 which is stored in the storing portion 207. The usage bandwidth may be acquired from the network 103 through a communication such as a DHCP.

The transmission control portion 208 executes a communication control processing for transferring various data together with the another communicating apparatus 101 through the network I/F 214 and the network 103. More specifically, for example, the transmission control portion 208 transmits, to the communicating apparatus (a receiving side) 102 through the network 103, a call connection request specifying information about the usage bandwidth of the communicating apparatus (the transmitting side) 101 which is acquired. Then, the transmission control portion 208 receives a response to the call connection request from the communicating apparatus (the receiving side) 102 through the network 103. During the call established, moreover, image data stored in the image storing portion 202 are transmitted to the communicating apparatus (the receiving side) 102, for example. The data are divided into a plurality of packets to be transmitted, for example. Furthermore, the other specific processings of the transmission control portion 208 will be described below.

The second usage bandwidth acquiring portion 210 acquires a negotiation result (a second usage bandwidth) for the usage bandwidth in a data transmission from the response to the call connection request. The negotiation result is determined based on each of the usage bandwidths of the communicating apparatus (the transmitting side) 101 and the communicating apparatus (the receiving side) 102.

More specifically, for example, description will be given by utilizing the case in which the communicating apparatus (the transmitting side) 101 includes, in the call connection request, 1.0 Mbps as information about its own usage bandwidth and transmits the information to the communicating apparatus (the receiving side) 102.

In the case in which the usage bandwidth of the communicating apparatus (the receiving side) 102 is 1.0 Mbps, for example, the communicating apparatus (the receiving side) 102 transmits the 1.0 Mbps as the negotiation result to the communicating apparatus (the transmitting side) 101. In other words, in the case in which the usage bandwidth of the communicating apparatus (the receiving side) 102 is equal to that of the communicating apparatus (the transmitting side) 101, the communicating apparatus (the receiving side) 102 transmits its own usage bandwidth as the negotiation result. The negotiation result is included in the response to the call connection request.

Moreover, in the case in which the usage bandwidth of the communicating apparatus (the receiving side) 102 is 0.5 Mbps, for example, the communicating apparatus (the receiving side) 102 transmits 0.5 Mbps as the negotiation result. In other words, in the case in which the usage bandwidth of the communicating apparatus (the receiving side) 102 has a smaller value than that of the communicating apparatus (the transmitting side) 101, the communicating apparatus (the receiving side) 102 transmits its own usage bandwidth as the negotiation result.

On the other hand, in the case in which the usage bandwidth of the communicating apparatus (the receiving side) 102 is 1.5 Mbps, for example, the communicating apparatus (the receiving side) 102 transmits 1.0 Mbps as the negotiation result. In other words, in the case in which the usage bandwidth of the communicating apparatus (the receiving side) 102 has a greater value than that of the communicating apparatus (the transmitting side) 101, the communicating apparatus (the receiving side) 102 transmits, as the negotiation result, the usage bandwidth which is transmitted.

The comparing portion 211 compares the negotiation result with the usage bandwidth (the first usage bandwidth) which is set into a self-apparatus, that is, the communicating apparatus (the transmitting side) 101 and is acquired by the first usage bandwidth acquiring portion 209.

The transmission speed control portion 212 controls the transmission control portion 208 to transmit data to the communicating apparatus (the receiving side) 102 at a transmission speed corresponding to a result of the comparison. More specifically, if it is decided that the negotiation result is identical to the usage bandwidth which is set, an instruction is given to the transmission control portion 208 in order to transmit the data at a transmission speed which is obtained by reducing the usage bandwidth corresponding to a rate set to the regulation rate setting portion 213. The regulation rate setting portion 213 holds a rate for reducing the usage bandwidth, and a predetermined rate is 5% or 20%, for example.

More specifically, for example, in the case in which the usage bandwidth of the communicating apparatus (the transmitting side) 101 is 1.0 Mbps, the negotiation result is also 1.0 Mbps and the regulation rate is set to be 5%, the transmission speed control portion 212 gives the transmission control portion 208 an instruction for transmitting data at 0.95 Mbps to be a transmission speed obtained by a reduction of 5% from the usage bandwidth of 1.0 Mbps.

On the other hand, in the case in which the comparing portion 211 decides that the usage bandwidth is different from the negotiation result, an instruction is given to the transmission control portion 208 in order to transmit the data at a transmission speed based on the usage bandwidth to be the negotiation result.

More specifically, for example, in the case in which the usage bandwidth of the communicating apparatus (the transmitting side) 101 is 1.0 Mbps and the negotiation result is 0.5 Mbps, the transmission speed control portion 212 gives the transmission control portion 208 an instruction for transmitting the data at a transmission speed of 0.5 Mbps which is the transmission speed to be the negotiation result.

As shown in FIG. 2, the system control portion 201, the image storing portion 202, the scanner 203, the printer 204, the operating/displaying portion 205, the image processing portion 206, the transmission control portion 208 and the first usage bandwidth acquiring portion 209 are connected to an internal bus 215 respectively, and each of the portions is controlled via the internal bus 215.

Figure 3:
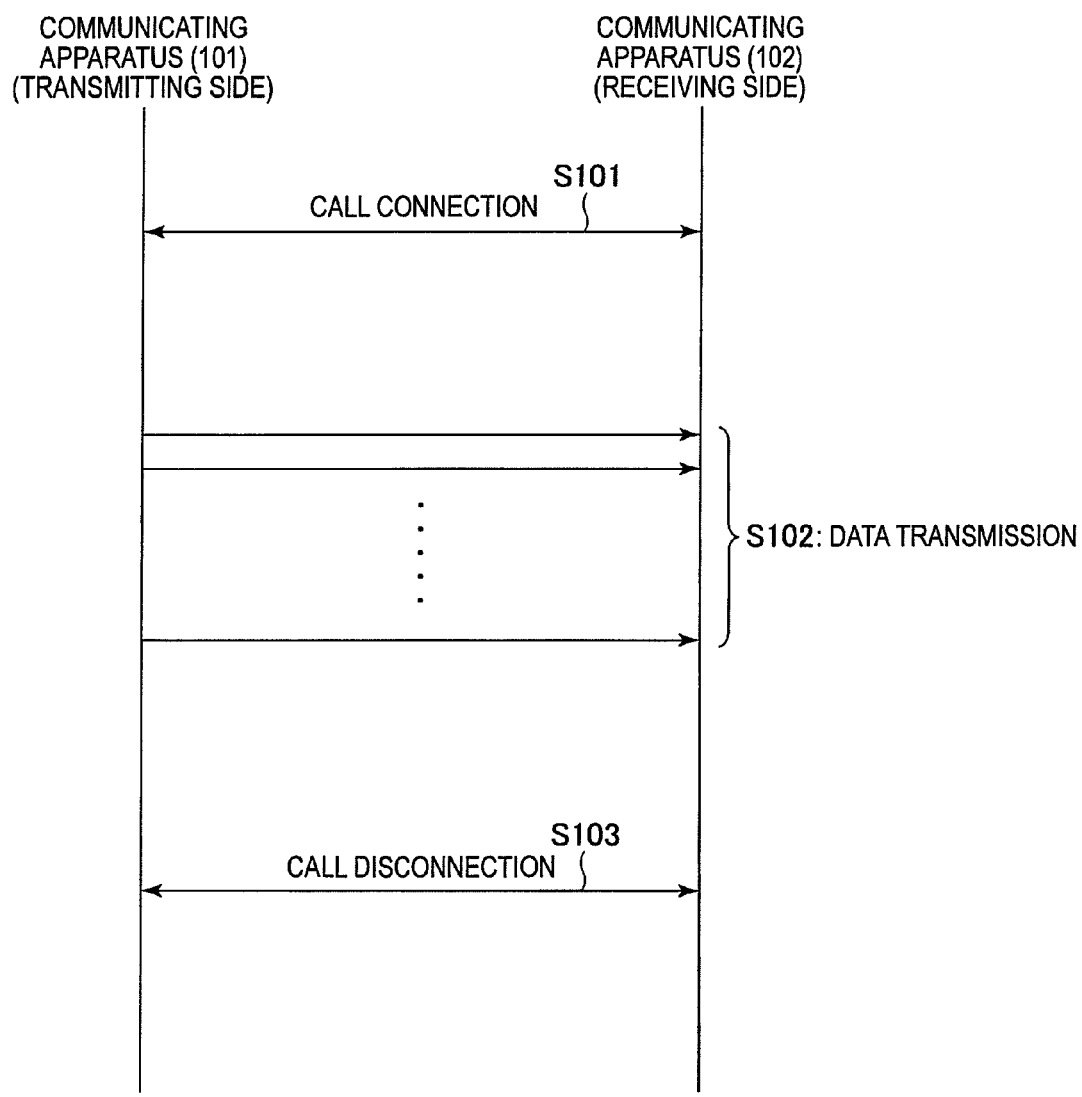
FIG. 3 is a diagram for explaining an outline of a sequence in the communicating apparatus according to the first embodiment.

FIG. 3 is a diagram for explaining an outline of a sequence in the communicating apparatus according to the embodiment. As shown in FIG. 3, first of all, a call connection is carried out through the communicating apparatus (the transmitting side) 101 and the communicating apparatus (the receiving side) 102, and a negotiation is performed for a speed of a transmission (a usage bandwidth) of data to the communicating apparatus (the receiving side) 102 (S101). Subsequently, the data are transmitted at a transmission speed corresponding to a negotiation result (S102). Then, the call connection is cut off (S103). A more detailed flow of the communicating apparatus (the transmitting side) 101 will be described below with reference to FIG. 4.

Figure 4:
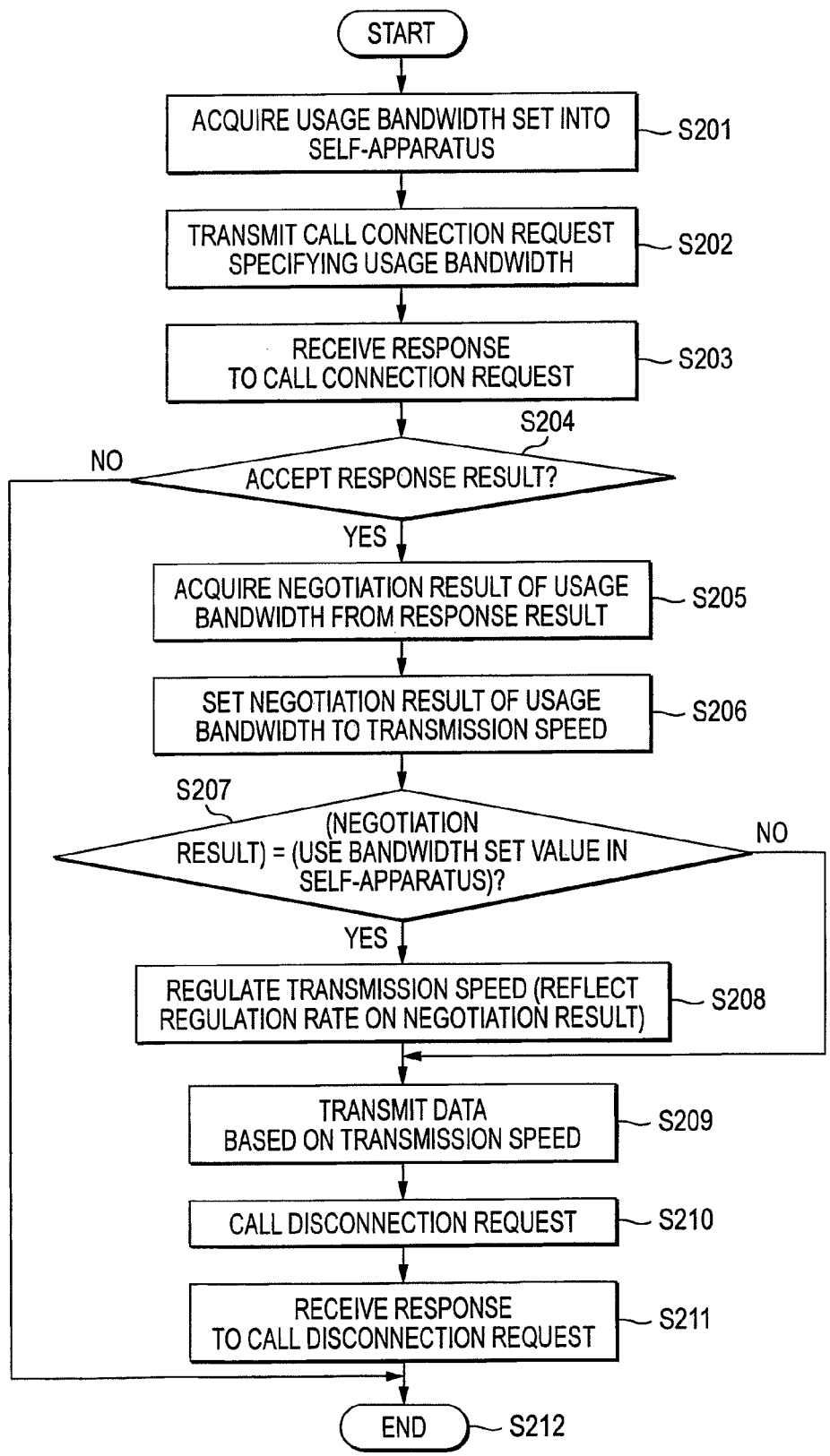
FIG. 4 is a flowchart for explaining a processing flow of the communicating apparatus according to the first embodiment.

FIG. 4 is a flowchart for explaining a processing flow of the communicating apparatus 101 according to the embodiment.

As shown in FIG. 4, the first usage bandwidth acquiring portion 209 acquires a usage bandwidth set into the communicating apparatus 101, that is, a self-apparatus (S201). The usage bandwidth is stored in the storing portion 207, for example.

The transmission control portion 208 transmits a call connection request specifying information about the acquired usage bandwidth to the communicating apparatus (the receiving side) 102 through the network 103 (S202). The information about the usage bandwidth implies a transmission speed which can be taken at a maximum as the communicating apparatus in the utilization of the network 103 by the communicating apparatus 101 (a transmission quantity per unit time) as described above, and is set to have a value which is equal to a value in the utilization contract of the network 103 or a value which is smaller than the value in the utilization contract of the network 103.

The transmission control portion 208 receives a response to the call connection request from the communicating apparatus (the receiving side) 102 through the network 103 (S203).

The transmission control portion 208 decides whether the communicating apparatus (the receiving side) 102 accepts the specified usage bandwidth (the transmission speed) or not based on a result of the response (S204). If it is decided that the acceptance is not carried out, the call connection is cut off so that the processing is ended (S212).

On the other hand, if it is decided that the acceptance is carried out, the second usage bandwidth acquiring portion 210 acquires a negotiation result (a second usage bandwidth) for the usage bandwidth from the result of the response (S205).

The transmission speed control portion 212 sets the negotiation result as a data transmission speed in the communication of the communicating apparatus (the transmitting side) 101 and the communicating apparatus (the receiving side) 102 (S206).

The comparing portion 211 compares the negotiation result with the usage bandwidth (the first usage bandwidth) acquired by the first usage bandwidth acquiring portion 209 (S207).

If the comparing portion 211 decides that the negotiation result is identical to the first usage bandwidth, the transmission speed control portion 212 sets, as a speed in a data transmission, a transmission speed obtained by reducing the transmission speed based on the first usage bandwidth corresponding to a predetermined rate set to the regulation rate setting portion 213 (S208). In this case, the transmission speed based on the first usage bandwidth is identical to the negotiation result. Therefore, it is apparent that the transmission speed obtained by reducing the transmission speed based on the second usage bandwidth corresponding to the predetermined rate set to the regulation rate setting portion 213 may be set to be a speed in the data transmission.

The transmission control portion 208 transmits data to the communicating apparatus (the receiving side) 102 at the transmission speed set by the transmission speed control portion 212 (S209).

In other words, if the comparing portion 211 decides that the negotiation result is identical to the set usage bandwidth as described above, the data are transmitted at the transmission speed based on the reduced usage bandwidth.

On the other hand, if the comparing portion 211 decides that the usage bandwidth is different from the negotiation result, the transmission control portion 208 transmits the data to the communicating apparatus (the receiving side) 102 at a transmission speed based on the usage bandwidth set in the S206, that is, the usage bandwidth (the second usage bandwidth) to be the negotiation result.

Next, the communicating apparatus (the transmitting side) 101 transmits a call disconnection request to the communicating apparatus (the receiving side) 102 (S210), and the communicating apparatus (the transmitting side) 101 receives a response to the call disconnection request from the communicating apparatus (the receiving side) 102 (S211). Then, the call connection is ended (S212).

As described above, the communicating apparatus 101 according to the embodiment regulates the transmission speed of the data in the communication between the communicating apparatuses 101 and 102 depending on a result of the comparison between the usage bandwidth (the first usage bandwidth) which is preset to the communicating apparatus (the transmitting side) 101 and the negotiation result (the second usage bandwidth).

More specifically, if it is decided that the negotiation result is identical to the usage bandwidth of the communicating apparatus 101, the data are transmitted at a lower transmission speed than the speed based on the usage bandwidth of the communicating apparatus 101 to prevent a failure of the transmission from being caused by a band control in the network 103, for example, a situation in which the processing of the communicating apparatus 101 is executed in software and a transmission rate of a packet thus exceeds the usage bandwidth temporarily so that the packet is discarded. On the other hand, if it is decided that the usage bandwidth is different from the negotiation result, the transmission control portion 208 transmits the data to the communicating apparatus (the receiving side) 102 in the usage bandwidth to be the negotiation result and prevents the data from being transmitted at an unnecessarily lower transmission speed than the transmission speed based on the usage bandwidth of the communicating apparatus 101.

The invention is not restricted to the embodiment but may be replaced with a substantially identical structure to the structure described in the embodiment, a structure for producing the same functions and effects or a structure capable of achieving the same object. Moreover, negotiation means in the claims is equivalent to the transmission control portion 208, for example, and communicating means is equivalent to the transmission speed control portion 212, the transmission control portion 208 and the network I/F 214, for example.

[Second Embodiment]

Figure 5:
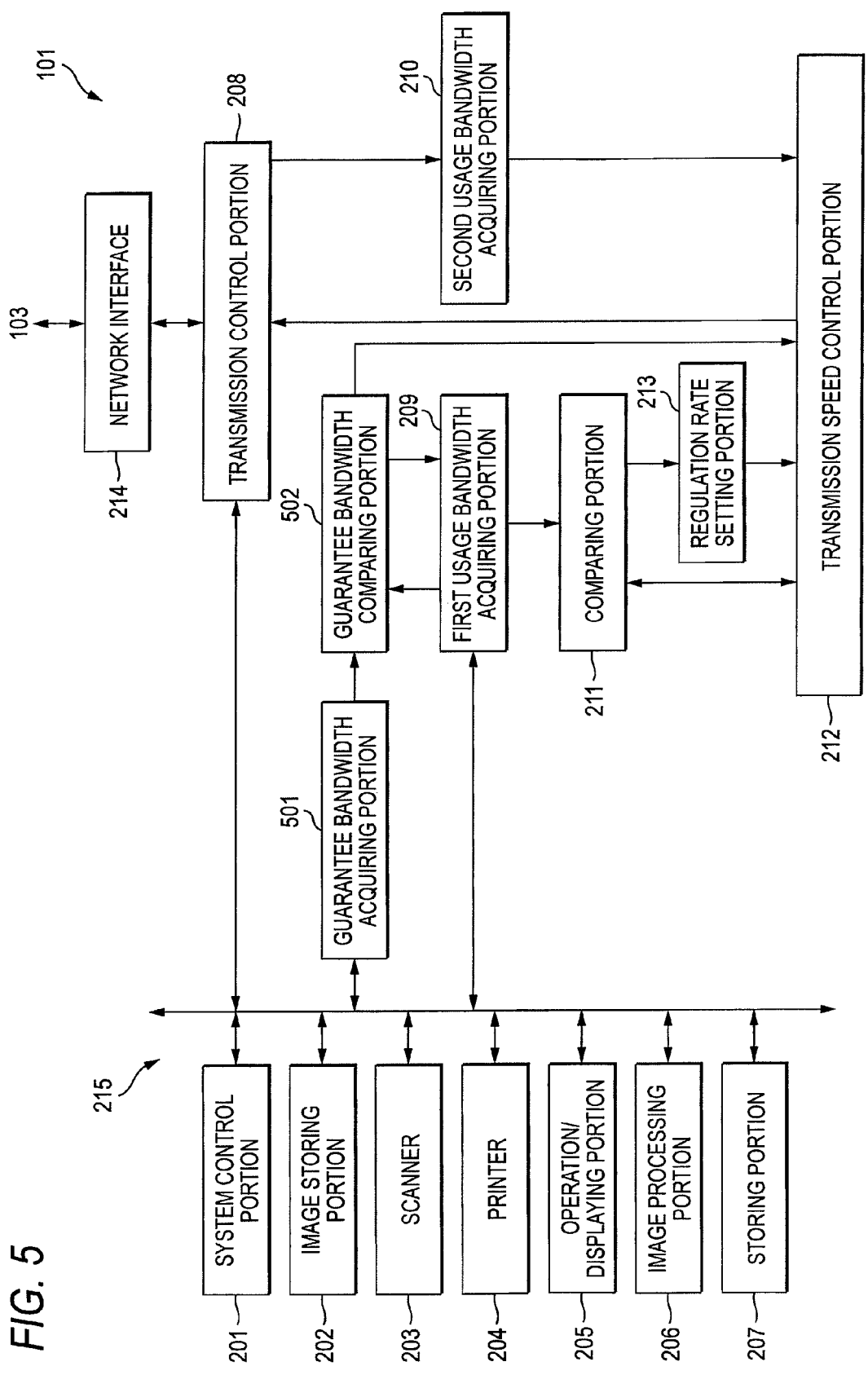
FIG. 5 is a diagram for explaining a communicating apparatus on a transmitting side according to a second embodiment.

FIG. 5 is a diagram for explaining a communicating apparatus according to a second embodiment of the invention. The embodiment is mainly different from the first embodiment in that a communicating apparatus 101 has a guarantee bandwidth acquiring portion 501 and a guarantee bandwidth comparing portion 502. In the following description, explanation of the same respects as those in the first embodiment will be omitted.

As shown in FIG. 5, the communicating apparatus 101 on a transmitting side according to the embodiment further has the guarantee bandwidth acquiring portion 501 and the guarantee bandwidth comparing portion 502.

The guarantee bandwidth acquiring portion 501 acquires a guarantee bandwidth of a network 103 connected to the communicating apparatus 101. The guarantee bandwidth of the network 103 is held in a storing portion 207 and is acquired from the storing portion 207, for example. Moreover, it is also possible to employ a structure in which the guarantee bandwidth of the network 103 is acquired from the network 103 through a communication such as a DHCP.

The guarantee bandwidth comparing portion 502 compares a usage bandwidth set into a self-apparatus, that is, the communicating apparatus 101 with the acquired guarantee bandwidth. If it is decided that the usage bandwidth is different from the guarantee bandwidth, a transmission speed control portion 212 sets to transmit data at a transmission speed based on a usage bandwidth to be a negotiation result.

On the other hand, if it is decided that the usage bandwidth is identical to the guarantee bandwidth, a comparing portion 211 executes the same processing as that in the first embodiment, for example, compares the negotiation result with the usage bandwidth set into the self-apparatus, that is, the communicating apparatus 101. Accordingly, the description will be omitted.

Figure 6:
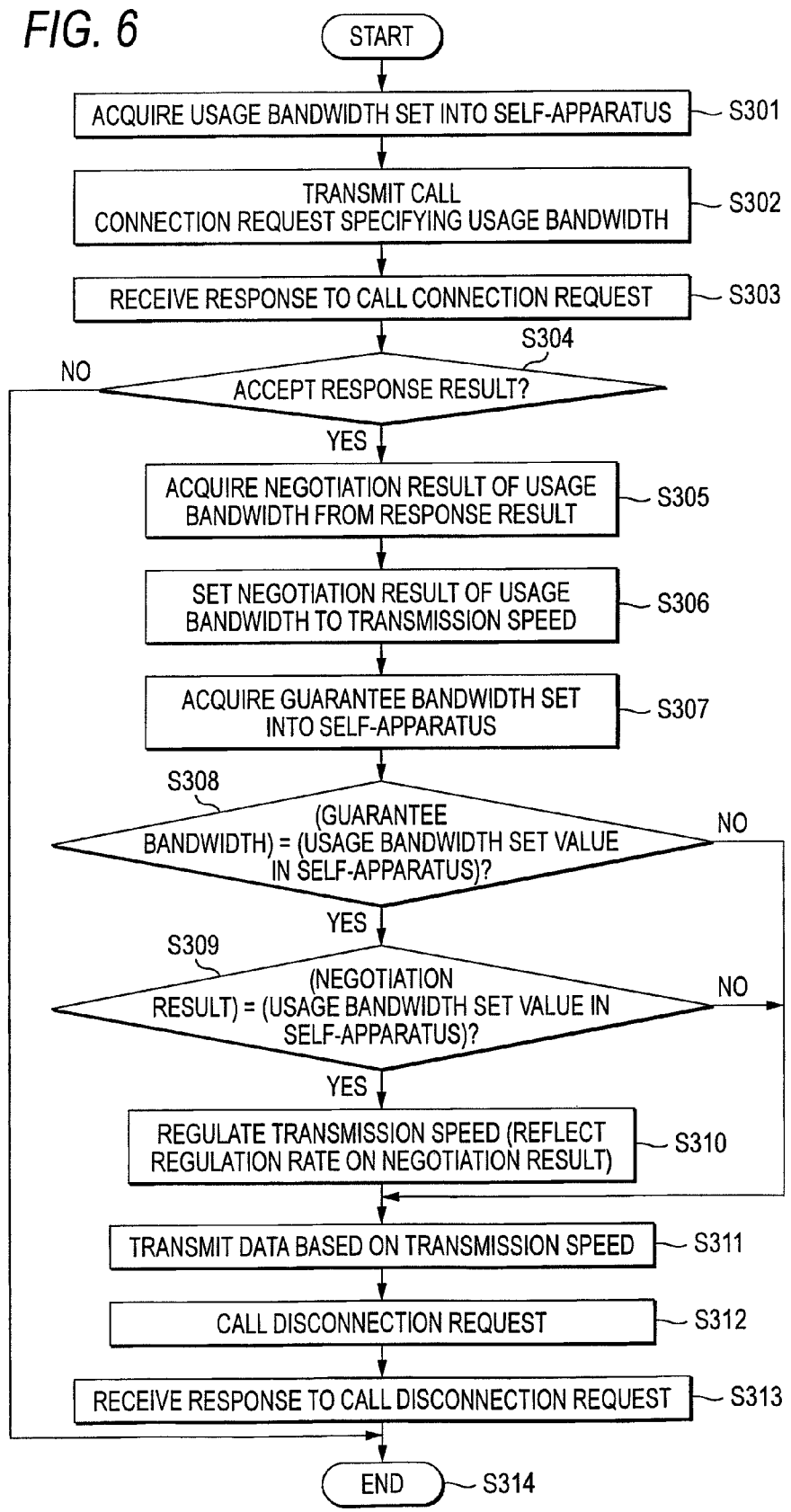
FIG. 6 is a flowchart for explaining a flow of the communicating apparatus on the transmitting side according to the second embodiment.

FIG. 6 is a flowchart for explaining a flow of the communicating apparatus on the transmitting side according to the embodiment.

As shown in FIG. 6, in the same manner as in the S201 to S206 according to the first embodiment, a first usage bandwidth acquiring portion 209 acquires a usage bandwidth set into the communicating apparatus (the transmitting side) 101, that is, the self-apparatus (S301).

A transmission control portion 208 transmits a call connection request specifying information about the acquired usage bandwidth to a communicating apparatus (a receiving side) 102 through the network 103 (S302).

The transmission control portion 208 receives a response to the call connection request from the communicating apparatus (the receiving side) 102 through the network 103 (S303).

The transmission control portion 208 decides whether the communicating apparatus (the receiving side) 102 accepts a transmission speed of data based on the specified usage bandwidth or not based on a result of the response (S304). If it is decided that the acceptance is not carried out, the call connection is cut off so that the processing is ended (S314).

On the other hand, if it is decided that the acceptance is carried out, a second usage bandwidth acquiring portion 210 acquires a negotiation result for the usage bandwidth from the result of the response (S305).

The transmission speed control portion 212 sets the transmission speed based on the negotiation result as a transmission speed in a communication of the communicating apparatus (the transmitting side) 101 and the communicating apparatus (the receiving side) 102 (S306).

Next, the guarantee bandwidth acquiring portion 501 acquires a guarantee bandwidth set to the communicating apparatus (the transmitting side) 101 (S307).

The guarantee bandwidth comparing portion 502 compares a usage bandwidth (a first usage bandwidth) and the guarantee bandwidth which are set into the self-apparatus, that is, the communicating apparatus (the transmitting side) 101 with each other (S308).

If it is decided that the usage bandwidth (the first usage bandwidth) is identical to the guarantee bandwidth, the comparing portion 211 compares the negotiation result with the usage bandwidth (the first usage bandwidth) acquired by the first usage bandwidth acquiring portion 209 (S309). On the other hand, if it is decided that the usage bandwidth is different from the guarantee bandwidth, the processing proceeds to S311.

If the comparing portion 211 decides that the negotiation result is identical to the first usage bandwidth, the transmission speed control portion 212 sets, as a transmission speed in a data communication, a transmission speed obtained by reducing a transmission speed based on the first usage bandwidth corresponding to a predetermined rate set to a regulation rate setting portion 213 (S310).

The transmission control portion 208 transmits data to the communicating apparatus (the receiving side) 102 at the transmission speed acquired from the transmission speed control portion 212 (S311).

The communicating apparatus (the transmitting side) 101 transmits a call disconnection request to the communicating apparatus (the receiving side) 102 (S312), and the communicating apparatus (the transmitting side) 101 receives a response to the call disconnection request from the communicating apparatus (the receiving side) 102 (S313). Then, the call connection is ended (S314).

As described above, the communicating apparatus 101 according to the second embodiment regulates the transmission speed between the communicating apparatuses 101 and 102 depending on the result of the comparison between the usage bandwidth (the first usage bandwidth) which is preset to the communicating apparatus (the transmitting side) 101 and the negotiation result. More specifically, in the case in which the guarantee bandwidth and the usage bandwidth in the communicating apparatus (the transmitting side) 101 are identical to each other and the negotiation result is identical to the usage bandwidth of the communicating apparatus (the transmitting side) 101, the data are transmitted to the communicating apparatus (the receiving side) 102 at the transmission speed which is reduced more greatly than the transmission speed based on the usage bandwidth of the communicating apparatus (the transmitting side) 101. In the case in which the guarantee bandwidth and the usage bandwidth in the communicating apparatus (the transmitting side)

101 are different from each other, the data are prevented from being transmitted at the reduced transmission speed.

The invention is not restricted to the embodiment but may be replaced with a substantially identical structure to the structure described in the embodiment, a structure for producing the same functions and effects or a structure capable of achieving the same object.

[Third Embodiment]

Figure 7:
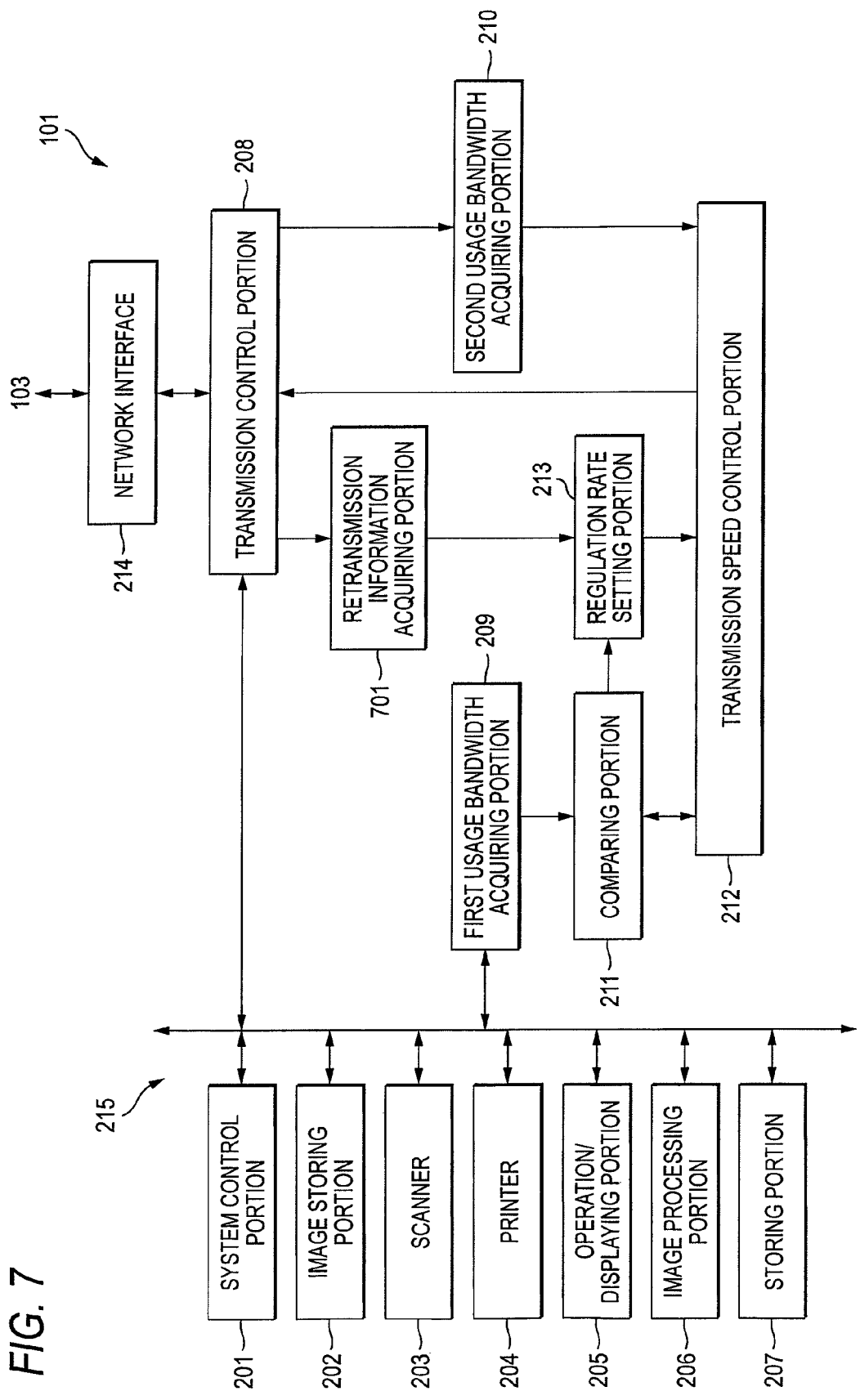
FIG. 7 is a diagram for explaining a communicating apparatus according to a third embodiment.

FIG. 7 is a diagram for explaining a communicating apparatus according to a third embodiment of the invention. The embodiment is mainly different from the first embodiment in that a communicating apparatus 101 on a transmitting side has a retransmission information acquiring portion 701. Description of the same respects as those in the first embodiment will be omitted.

The retransmission information acquiring portion 701 acquires retransmission information based on data to be retransmitted during a transmission of the data. More specifically, in the case in which the communicating apparatus 101 is an IP fax, for example, the retransmission information acquiring portion 701 counts the number of packets in the transmitted data and that of packets to be retransmitted during the transmission of the data, and detects and acquires a ratio (a retransmission generation ratio) as retransmission information in a single communication of the IP fax.

A regulation rate setting portion 213 holds information about a relationship between the retransmission information and a regulation rate of a usage bandwidth and sets a regulation rate based on the information about the relationship. More specifically, for example, information about a relationship between retransmission information and a regulation rate of a usage bandwidth shown in FIG. 8 is held in a form of a table, and a value obtained by adding a value of the table to a set regulation rate is set to be a regulation rate.

In other words, in the case in which the regulation rate of the usage bandwidth is 5% and the retransmission generation ratio to be the retransmission information is 10%, for example, a regulation rate corresponding to the 10% is 5% in FIG. 8. Therefore, the regulation rate setting portion 213 calculates their sum, that is, 10% (=5%+5%) and sets a usage bandwidth obtained by a reduction of 10% as a transmission speed.

The information about the relationship is not restricted to the form of the table but may be held in another form. Moreover, it is also possible to employ a structure in which the information about the relationship is held in a storing portion 207 and the regulation rate setting portion 213 acquires the information about the relationship from the storing portion 207.

Although there is employed the structure in which the regulation rate is set depending on the table in the foregoing, it is also possible to employ a structure in which an operating/displaying portion 205 is caused to carry out a display and a user refers to the displayed retransmission information to determine the regulation rate, and the regulation rate is thus held in the regulation rate setting portion 213, for example.

Next, an outline of a sequence in the communicating apparatus 101 according to the embodiment will be described with reference to FIG. 9. In the following description, for a processing from a first call connection to a call disconnection, it is assumed that the regulation rate of the usage bandwidth is set to be 0% and a transmission speed between the communicating apparatus 101 and a communicating apparatus 102, that is, a negotiation result for the usage bandwidth is 1.0 Mbps, for example.

Figure 9:
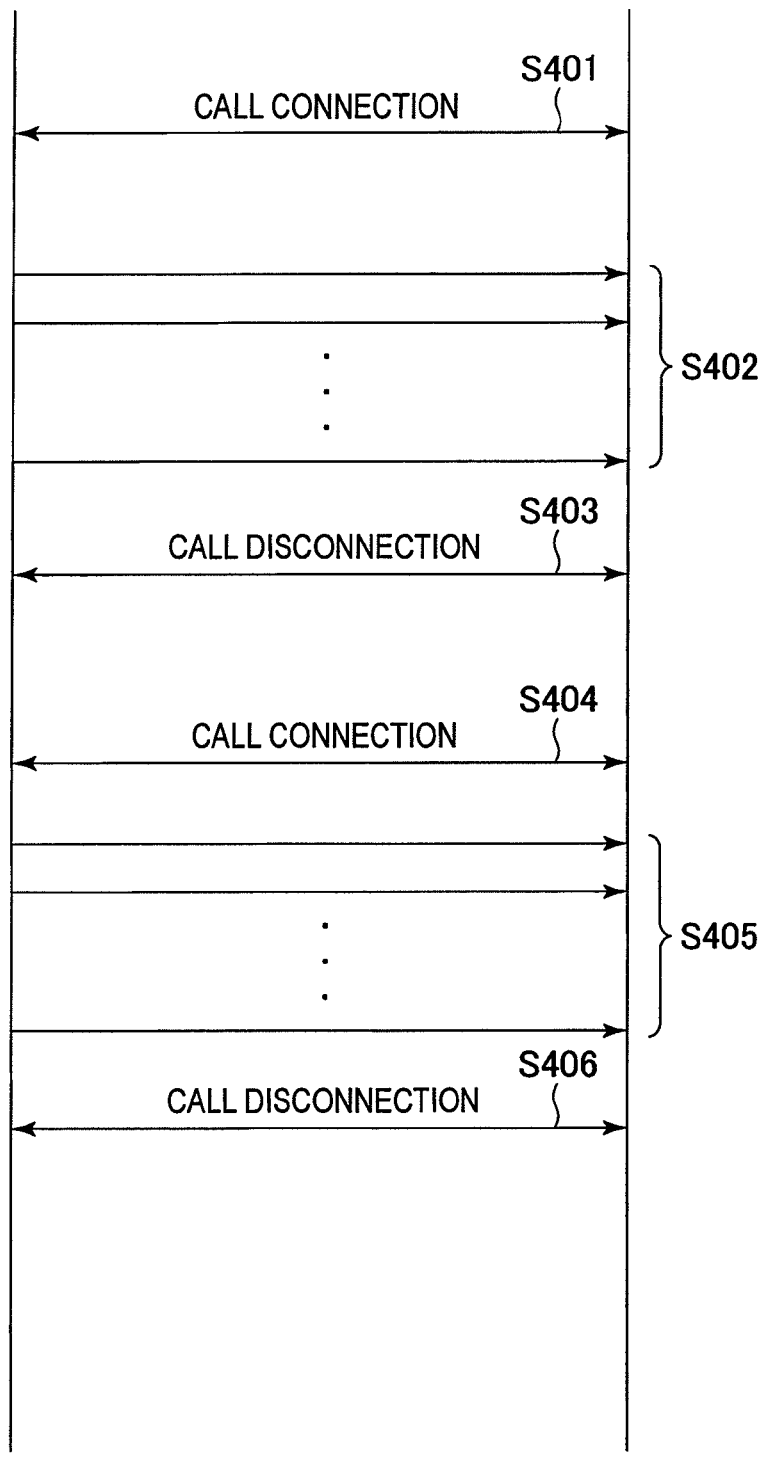
FIG. 9 is a diagram for explaining an outline of a sequence in the communicating apparatus according to the third embodiment.

First of all, as shown in FIG. 9, a call connection is carried out by the communicating apparatus (a transmitting side) 101 and the communicating apparatus (a receiving side) 102, and a transmission speed is negotiated (S401). Next, the communicating apparatus (the transmitting side) 101 transmits data to the communicating apparatus (the receiving side) 102 at a transmission speed corresponding to a result of the negotiation (S402).

At this time, in some cases in which data are divided into a plurality of packets to be transmitted, for example, each processing of the communicating apparatus 101 is executed in software and a transmission speed of the data thus exceeds a usage bandwidth temporarily so that the packet is discarded, resulting in no arrival of the packet at the communicating apparatus (the receiving side) 102. In these cases, the packet which does not reach the communicating apparatus (the receiving side) 102 is retransmitted. More specifically, in the case in which 300 packets in total are transmitted, for example, 30 packets are retransmitted. Then, the call connection is cut off (S403). In the example, it is assumed that the regulation rate of the usage bandwidth is set to be 0%. Therefore, the packet is transmitted at 1.0 Mbps.

In the case in which 30 packets are retransmitted when 300 packets in total are transmitted as described above, for example, the retransmission generation ratio is 30/300, that is, 10%. Referring to the retransmission generation ratio of 10%, the regulation rate in this case is 5% with reference to the table of FIG. 8. Therefore, the 5% is set to the regulation rate setting portion 213.

In a next data transmission, in the same manner as described above, a call connection is carried out by the communicating apparatus (the transmitting side) 101 and the communicating apparatus (the receiving side) 102 to negotiate a transmission speed (S404). Then, a packet is transmitted at a transmission speed corresponding to a result of the negotiation (S405). At this time, the regulation rate is set to be 5% as described above. Therefore, the packet is transmitted at a transmission speed obtained by a reduction of 5% from the 1.0 Mbps, that is, a transmission speed of 0.95 Mbps. Thereafter, the call connection is cut off (S406).

As described above, the communicating apparatus 101 according to the third embodiment regulates the transmission speed between the communicating apparatuses 101 and 102 depending on a comparison between the usage bandwidth of the communicating apparatus (the transmitting side) 101 and the result of the negotiation. Thus, a failure of the transmission is prevented from being caused by a band control in a network 103. More specifically, the usage bandwidth is regulated based on the data to be retransmitted during the transmission of the data.

The invention is not restricted to the embodiment but may be replaced with a substantially identical structure to the structure described in the embodiment, a structure for producing the same functions and effects or a structure capable of achieving the same object.

[Fourth Embodiment]

Figure 10:
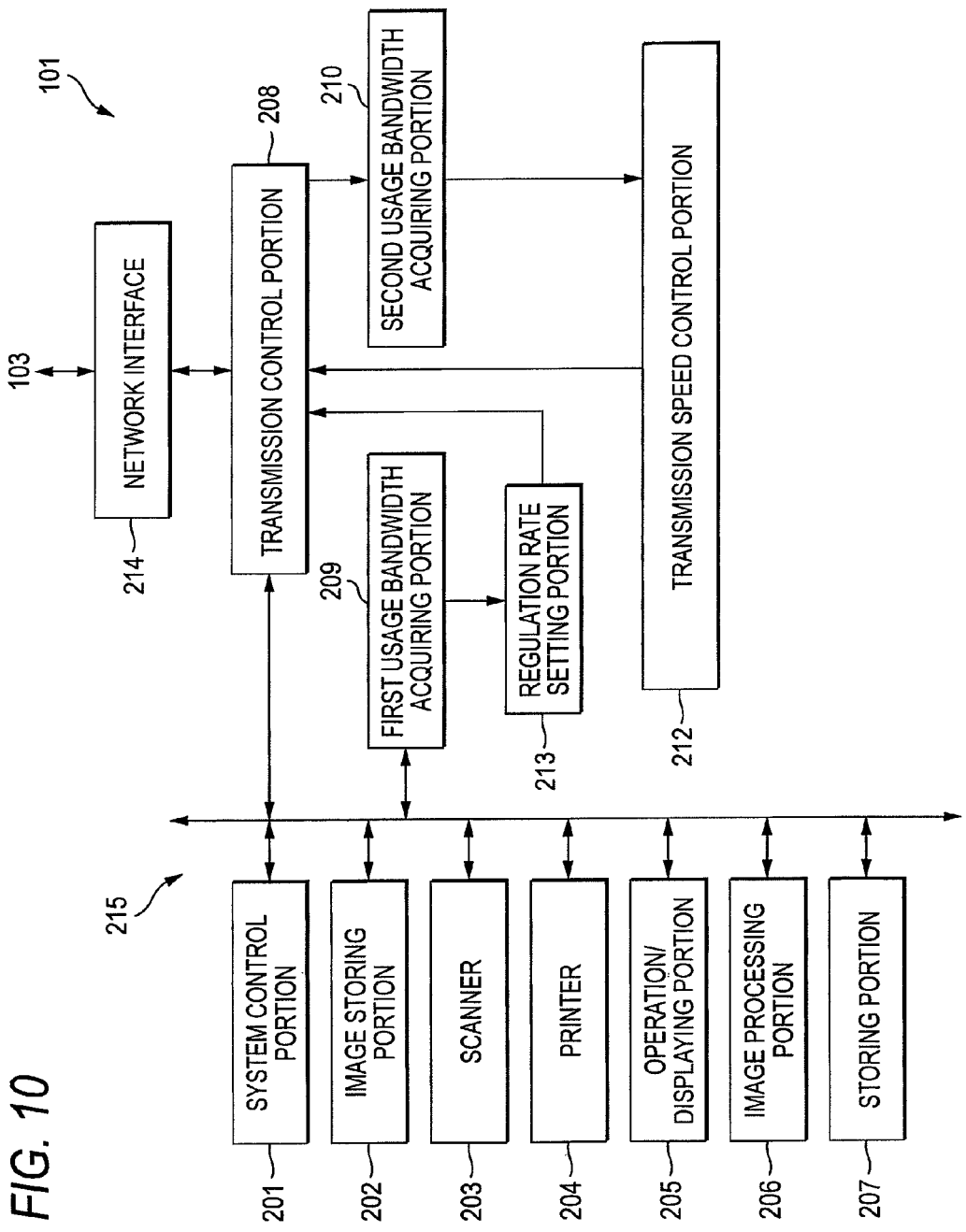
FIG. 10 is a diagram for explaining a communicating apparatus on a transmitting side according to a fourth embodiment.

FIG. 10 is a diagram for explaining a communicating apparatus on a transmitting side according to a fourth embodiment of the invention. The fourth embodiment is mainly different from the first embodiment in that a first usage bandwidth is not compared with a second usage bandwidth but a transmission speed in a communication is negotiated by utilizing information corresponding to a usage bandwidth obtained by reducing the first usage bandwidth corresponding to a predetermined rate. Description of the same respects as those in the first embodiment will be omitted.

A regulation rate setting portion 213 generates information about a regulation bandwidth which is obtained by reducing the first usage bandwidth corresponding to a predetermined rate (regulation bandwidth information).

A transmission control portion 208 acquires the regulation bandwidth information from the regulation rate setting portion 213, and furthermore, transmits a call connection request specifying the regulation bandwidth information to a communicating apparatus (a receiving side) 102. Then, the transmission control portion 208 receives a response to the call connection request from the communicating apparatus (the receiving side) 102 through a network 103.

Figure 11:
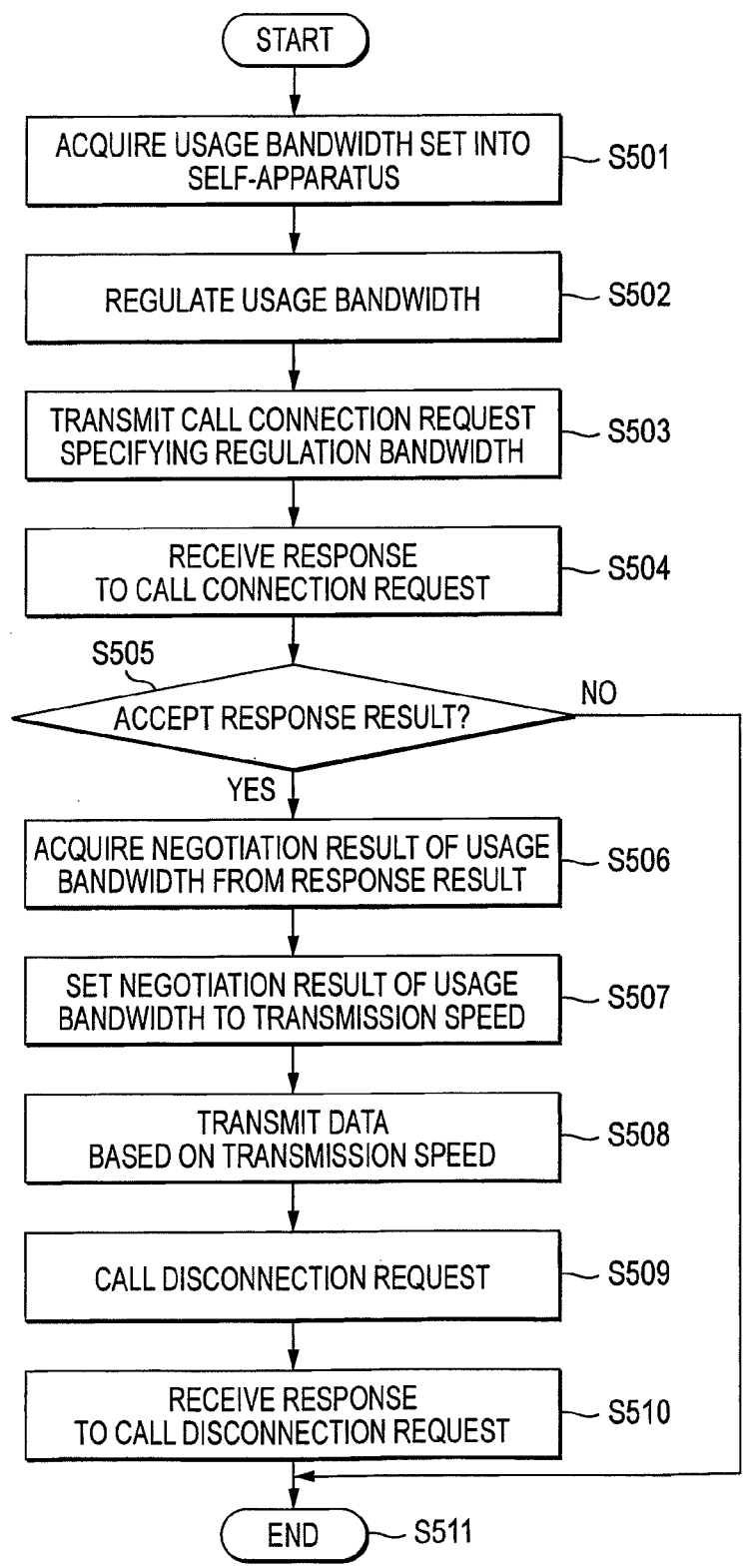
FIG. 11 is a flowchart for explaining a processing flow of the communicating apparatus according to the fourth embodiment.

FIG. 11 is a flowchart for explaining a processing flow of the communicating apparatus according to the embodiment.

As shown in FIG. 11, a first usage bandwidth acquiring portion 209 acquires a usage bandwidth set into a communicating apparatus (a transmitting side) 101, that is, a self-apparatus, for example (S501).

The regulation rate setting portion 213 generates and holds a regulation bandwidth to be a usage bandwidth obtained by reducing the first usage bandwidth corresponding to a predetermined rate (S502).

The transmission control portion 208 transmits a call connection request specifying information about the regulation bandwidth to the communicating apparatus (the receiving side) 102 (S503).

The transmission control portion 208 receives a response to the call connection request from the communicating apparatus (the receiving side) 102 through the network 103 (S504).

The transmission control portion 208 decides whether the call connection request specifying the regulation bandwidth is accepted from the communicating apparatus (the receiving side) 102 or not based on a result of the response (S505). If it is decided that the acceptance is not carried out, a call connection is cut off so that the processing is ended (S511).

On the other hand, if it is decided that the acceptance is carried out, a second usage bandwidth acquiring portion 210 acquires a negotiation result for a transmission speed from the result of the response (S506).

A transmission speed control portion 212 sets the negotiation result as a transmission speed in a communication of the communicating apparatus (the transmitting side) 101 and the communicating apparatus (the receiving side) 102 (S507).

The transmission control portion 208 transmits data to the communicating apparatus (the receiving side) 102 at the transmission speed to be the negotiation result set in the S507 (S508).

Next, the communicating apparatus (the transmitting side) 101 transmits a call disconnection request to the communicating apparatus (the receiving side) 102 (S509) and the communicating apparatus (the transmitting side) 101 receives a response to the call disconnection request from the communicating apparatus (the receiving side) 102 (S510). Then, the call connection is ended (S511).

As described above, the communicating apparatus 101 according to the fourth embodiment negotiates the transmission speed in the communication by utilizing the regulation bandwidth obtained by reducing the usage bandwidth of the communicating apparatus 101 corresponding to the predetermined rate, thereby preventing a failure of the transmission from being caused by a band control in the network 103. As compared with the communicating apparatus 101 according to the first embodiment, moreover, the processing in the comparing portion 211 is not required so that the processing of the communicating apparatus 101 is more simplified.

The invention is not restricted to the embodiment but may be replaced with a substantially identical structure to the structure described in the embodiment, a structure for producing the same functions and effects or a structure capable of achieving the same object.

[Fifth Embodiment]

Figure 12:
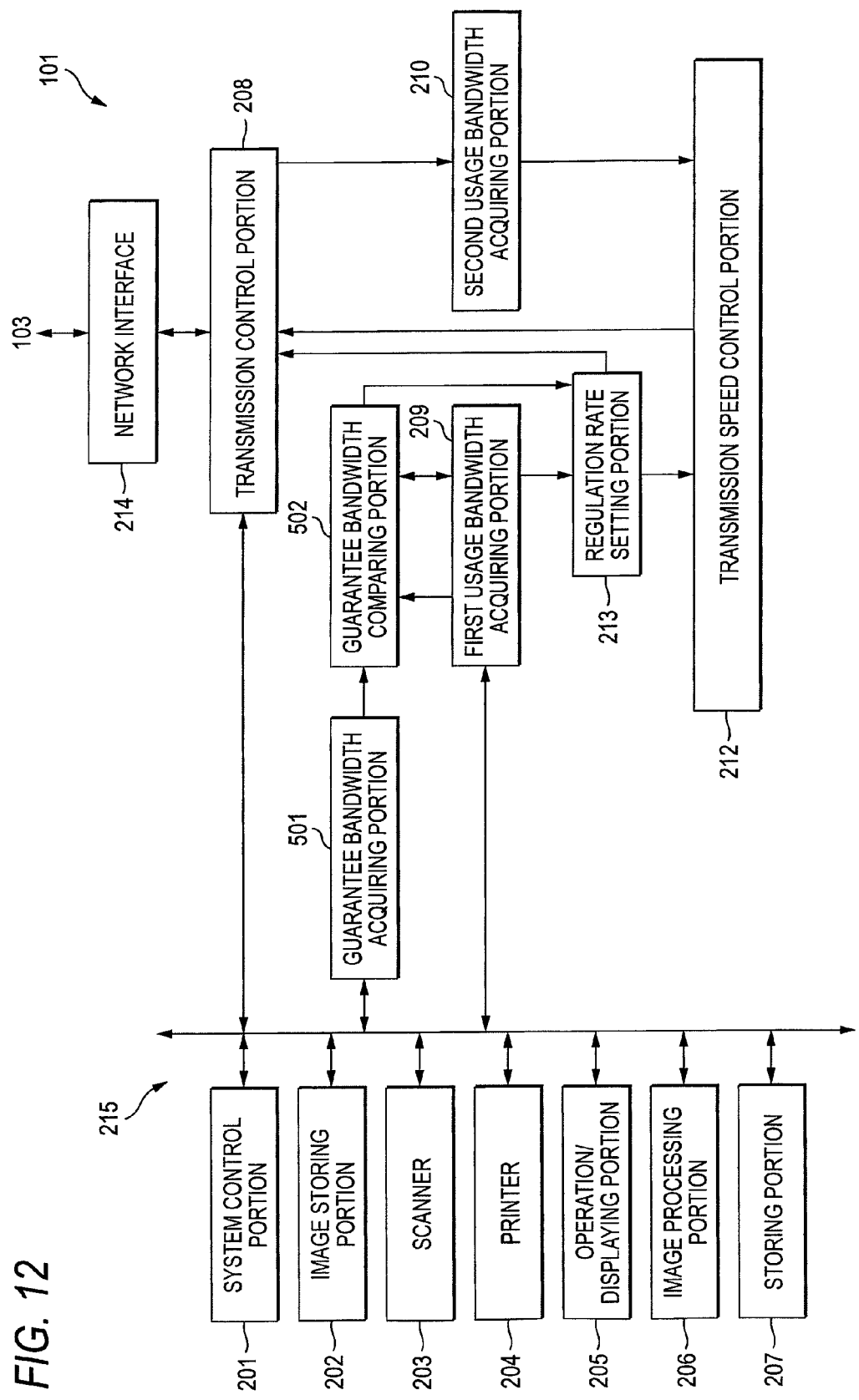
FIG. 12 is a diagram for explaining a communicating apparatus according to a fifth embodiment.

FIG. 12 is a diagram for explaining a communicating apparatus on a transmitting side according to a fifth embodiment of the invention. The fifth embodiment is mainly different from the fourth embodiment in that a guarantee bandwidth acquiring portion 501 and a guarantee bandwidth comparing portion 502 are provided. Description of the same respects as those in the fourth embodiment will be omitted.

The guarantee bandwidth acquiring portion 501 acquires a guarantee bandwidth of a communicating apparatus 101 on a transmitting side. For example, the guarantee bandwidth is stored in a storing portion 207.

The guarantee bandwidth comparing portion 502 compares a usage bandwidth (a first usage bandwidth) set into a self-apparatus, that is, the communicating apparatus (the transmitting side) 101 with the acquired guarantee bandwidth.

A transmission control portion 208 transmits a call connection request specifying information about the usage bandwidth to a communicating apparatus (a receiving side) 102. More specifically, if the guarantee bandwidth comparing portion 502 decides that the usage bandwidth and the guarantee bandwidth are identical to each other, a regulation rate setting portion 213 transmits, to the communicating apparatus (the receiving side) 102, a call connection request specifying information corresponding to a regulation bandwidth to be a usage bandwidth obtained by reducing the first usage bandwidth corresponding to a predetermined rate in the same manner as in the fourth embodiment.

On the other hand, if the guarantee bandwidth comparing portion 502 decides that the regulation bandwidth and the guarantee bandwidth are different from each other, a call connection request specifying information about the first usage bandwidth is transmitted to the communicating apparatus (the receiving side) 102. A more detailed processing of each portion will be described based on the following processing flow.

Figure 13:
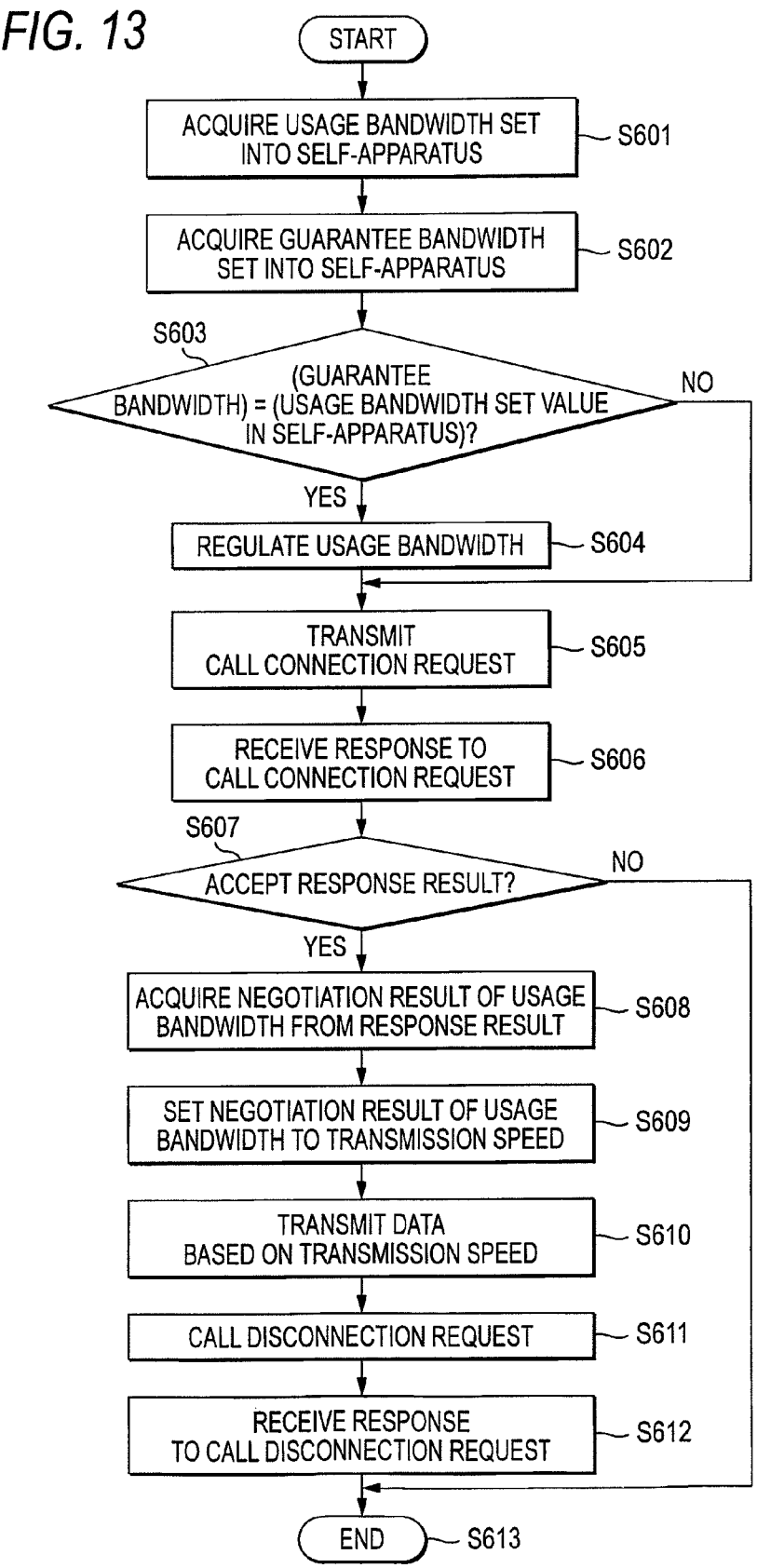
FIG. 13 is a flowchart for explaining a processing flow of the communicating apparatus according to the fifth embodiment.

FIG. 13 is a flowchart for explaining a processing flow in a transmission of the communicating apparatus according to the embodiment.

As shown in FIG. 10, a first usage bandwidth acquiring portion 209 acquires the usage bandwidth set into the communicating apparatus (the transmitting side) 101, that is, the self-apparatus, for example (S601).

The guarantee bandwidth acquiring portion 501 acquires the guarantee bandwidth set to the communicating apparatus (the transmitting side) 101 (S602).

The guarantee bandwidth comparing portion 502 compares the usage bandwidth and the guarantee bandwidth which are set to the communicating apparatus (the transmitting side) 101 and are acquired (S603).

If the guarantee bandwidth comparing portion 502 decides that the usage bandwidth and the guarantee bandwidth are identical to each other, the regulation rate setting portion 213 generates a regulation bandwidth obtained by reducing the first usage bandwidth corresponding to a predetermined rate in the same manner as in the fourth embodiment (S604).

On the other hand, if the guarantee bandwidth comparing portion 502 decides that the usage bandwidth and the guarantee bandwidth are different from each other, the processing proceeds to S605.

The transmission control portion 208 transmits, to the communicating apparatus (the receiving side) 102, a call connection request specifying information about the usage bandwidth (S605). More specifically, as described above, if the guarantee bandwidth comparing portion 502 decides that the usage bandwidth and the guarantee bandwidth are identical to each other, a call connection request specifying the regulation bandwidth is transmitted to the communicating apparatus (the receiving side) 102. On the other hand, if the guarantee bandwidth comparing portion 502 decides that the usage bandwidth and the guarantee bandwidth which are acquired in the S601 and the S602 respectively are different from each other, a call connection request specifying information about the usage bandwidth (the first usage bandwidth) acquired in the S601 is transmitted to the communicating apparatus (the receiving side) 102.

The transmission control portion 208 receives, through a network 103, a response to the call connection request from the communicating apparatus (the receiving side) 102 (S606).

The transmission control portion 208 decides whether the communicating apparatus (the receiving side) 102 accepts the specified usage bandwidth or not based on a result of the response (S607). If it is decided that the acceptance is not carried out, the call connection is cut off so that the processing is ended (S613).

On the other hand, if it is decided that the acceptance is carried out, a second usage bandwidth acquiring portion 210 acquires a negotiation result for the usage bandwidth from the result of the response (S608).

A transmission speed control portion 212 sets the negotiation result as a transmission speed of data in a communication of the communicating apparatus (the transmitting side) 101 and the communicating apparatus (the receiving side) 102 (S609).

The transmission control portion 208 transmits the data to the communicating apparatus (the receiving side) 102 at the transmission speed set in the S609 (S610).

Next, the communicating apparatus (the transmitting side) 101 transmits a call disconnection request to the communicating apparatus (the receiving side) 102 (S611) and receives a response to the call disconnection request from the communicating apparatus (the receiving side) 102 (S612). Then, the call connection is ended (S613).

As described above, the communicating apparatus 101 according to the fifth embodiment negotiates the transmission speed in the communication by utilizing the transmission speed obtained by reducing the transmission speed based on the usage bandwidth of the communicating apparatus 101 corresponding to a predetermined rate, thereby preventing a failure of the transmission from being caused by a band control in the network 103 if the guarantee bandwidth comparing portion 502 decides that the usage bandwidth and the guarantee bandwidth are identical to each other. As compared with the communicating apparatus 101 according to the second embodiment, moreover, the processing in the comparing portion 211 is not required so that the processing of the communicating apparatus 101 is more simplified.

The invention is not restricted to the first to fifth embodiments but it may be replaced with a substantially identical structure to the structure described in the embodiment, a structure for producing the same functions and effects or a structure capable of achieving the same object. In the invention, furthermore, it is also possible to use the first to fifth embodiments in combination if they are not inconsistent with each other.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communicating apparatus comprising:
a first acquire unit that acquires a first usage bandwidth to be a usage bandwidth of the communicating apparatus;
a negotiation unit that negotiates a negotiation result based on the first usage bandwidth and a transmission speed of another communicating apparatus, which is connected to the communicating apparatus through a network;
a second acquire unit that acquires a second usage bandwidth as the negotiation result obtained by the negotiation unit; and
a communicating unit that transmits data to the another communicating apparatus at a lower transmission speed than a transmission speed based on the first usage bandwidth corresponding to information about the second usage bandwidth.

2. The communicating apparatus according to claim 1 further comprising:
a comparing unit that compares the first usage bandwidth with the second usage bandwidth,
wherein the information about the second usage bandwidth is a comparison result obtained by the comparing unit.

3. The communicating apparatus according to claim 2, wherein if the comparing unit decides that the first usage bandwidth and the second usage bandwidth are identical to each other, the communicating unit transmits the data to the another communicating apparatus at a lower transmission speed than the transmission speed based on the first usage bandwidth.

4. The communicating apparatus according to claim 2, wherein if the comparing unit decides that the second usage bandwidth is different from the first usage bandwidth, the communicating unit transmits the data to the another communicating apparatus at a transmission speed based on the second usage bandwidth.

5. The communicating apparatus according to claim 3 further comprising:
a guarantee bandwidth acquiring unit that acquires a guarantee bandwidth of the network; and
a guarantee bandwidth comparing unit that compares the first usage bandwidth with the guarantee bandwidth,
wherein the communicating unit transmits the data to the another communicating apparatus at the lower transmission speed than the transmission speed based on the first usage bandwidth if the guarantee bandwidth comparing unit decides that the first usage bandwidth and the guarantee bandwidth are identical to each other and the comparing unit decides that the first usage bandwidth and the second usage bandwidth are identical to each other.

6. The communicating apparatus according to claim 5, wherein if the guarantee bandwidth comparing unit decides that the first usage bandwidth and the guarantee bandwidth are different from each other, the communicating unit transmits the data to the another communicating apparatus at a transmission speed based on the second usage bandwidth.

7. The communicating apparatus according to claim 1 further comprising:

a retransmission information acquiring unit that acquires retransmission information based on data to be retransmitted during the transmission of the data, the transmission speed at which the data are transmitted to the another communicating apparatus being based on the retransmission information.

8. The communicating apparatus according to claim 7 further comprising:

a displaying unit that displays display information corresponding to the retransmission information.

9. The communicating apparatus according to claim 1 further comprising a third acquiring unit that acquires regulation bandwidth information to be a bandwidth obtained by reducing the first usage bandwidth corresponding to a preset rate, the negotiation unit using the regulation bandwidth information as information corresponding to the first usage bandwidth.

10. The communicating apparatus according to claim 9 further comprising:

a guarantee bandwidth acquiring unit that acquires a guarantee bandwidth of the network; and a guarantee bandwidth comparing unit that compares the first usage bandwidth with the guarantee bandwidth, wherein the negotiation unit utilizes the regulation bandwidth information as the information corresponding to the first usage bandwidth if the guarantee bandwidth comparing unit decides that the first usage bandwidth and the guarantee bandwidth are identical to each other.

11. The communicating apparatus according to claim 10, wherein the negotiation unit utilizes the first usage bandwidth as the information corresponding to the first usage bandwidth if the guarantee bandwidth comparing unit decides that the first usage bandwidth and the guarantee bandwidth are different from each other.

12. The communicating apparatus according to claim 1, wherein the communicating unit divides the data into a plurality of packets to be transmitted.

13. A non-transitory tangible computer readable medium storing a program causing a computer to execute a process for communicating, the process comprising:

acquiring a first usage bandwidth to be a usage bandwidth of a communicating apparatus;

negotiating a negotiation result based on the first usage bandwidth and a transmission speed of another communicating apparatus, which is connected to the communicating apparatus through a network;

acquiring a second usage bandwidth as the negotiation result obtained by the negotiating; and transmitting data to the another communicating apparatus at a lower transmission speed than a transmission speed based on the first usage bandwidth corresponding to information about the second usage bandwidth.

* * * * *